US009234785B2

(12) United States Patent
Schulzki

(10) Patent No.: US 9,234,785 B2
(45) Date of Patent: Jan. 12, 2016

(54) WEIGHING DEVICE FOR WEIGHING DISCRETE AND RAPIDLY MOVING OBJECTS

(71) Applicant: Wipotec Wiege-und Positioniersysteme GmbH, Kaiserslautern (DE)

(72) Inventor: Alexander Schulzki, Stelzenberg (DE)

(73) Assignee: Wipotec Wiege- und Positioniersysteme GmbH, Kaiserslautern (DE)

( * ) Notice: Subject to any disclaimer, the term of this patent is extended or adjusted under 35 U.S.C. 154(b) by 160 days.

(21) Appl. No.: 13/855,571

(22) Filed: Apr. 2, 2013

(65) Prior Publication Data
US 2013/0284522 A1  Oct. 31, 2013

(30) Foreign Application Priority Data
Apr. 3, 2012 (EP) ..................... 12401060

(51) Int. Cl.
| G01G 19/03 | (2006.01) |
| G01G 17/00 | (2006.01) |
| G01G 15/00 | (2006.01) |
| B07C 5/16 | (2006.01) |
| B07C 5/18 | (2006.01) |
| G01G 11/00 | (2006.01) |
| G01G 23/00 | (2006.01) |
| B01D 61/12 | (2006.01) |

(52) U.S. Cl.
CPC ............... *G01G 11/00* (2013.01); *G01G 15/00* (2013.01); *G01G 17/00* (2013.01); *G01G 19/03* (2013.01); *G01G 23/002* (2013.01); *B01D 61/12* (2013.01); *B07C 5/16* (2013.01); *B07C 5/18* (2013.01); *G01G 11/003* (2013.01)

(58) Field of Classification Search
CPC ..... G01G 11/003; G01G 11/04; G01G 19/03; G01G 11/00; G01G 15/00; G01G 17/00; G01G 23/002; B07C 5/16; B07C 5/18
See application file for complete search history.

(56) References Cited

U.S. PATENT DOCUMENTS

| 2,279,041 | A | * | 4/1942 | Hadley ............................. 177/7 |
| 3,276,525 | A | * | 10/1966 | Cass ................................. 177/1 |
| 3,434,595 | A | * | 3/1969 | Seaborn et al. ................ 209/595 |
| 3,613,808 | A | * | 10/1971 | Bunnelle ........................ 177/53 |
| 4,550,793 | A | * | 11/1985 | Giles ............................. 177/145 |
| 4,709,770 | A | * | 12/1987 | Kohashi et al. ................. 177/50 |
| 4,788,930 | A | * | 12/1988 | Matteau et al. ................. 177/16 |
| 5,002,140 | A | | 3/1991 | Neumüller |
| 5,230,251 | A | * | 7/1993 | Brandt, Jr. ................. 73/861.72 |
| 5,230,391 | A | * | 7/1993 | Murata et al. .................. 177/50 |
| 5,308,930 | A | * | 5/1994 | Tokutu et al. .............. 177/25.13 |
| 5,495,773 | A | * | 3/1996 | Olesen ....................... 73/861.73 |
| 5,561,274 | A | | 10/1996 | Brandorff |
| 5,635,679 | A | * | 6/1997 | Kohashi et al. ............ 177/25.13 |
| 2009/0020340 | A1 | * | 1/2009 | Duppre ........................ 177/119 |
| 2011/0036644 | A1 | * | 2/2011 | Razzaghi ............... G01G 19/42 |
| | | | | 177/25.17 |

FOREIGN PATENT DOCUMENTS

EP  1216399 B1  2/2005

* cited by examiner

*Primary Examiner* — Randy W Gibson
(74) *Attorney, Agent, or Firm* — The Culbertson Group, P.C.

(57) ABSTRACT

The invention pertains to a weighing device for determining the weight of discrete weighing products in a speed-independent manner, wherein a weighing chute comprising a sliding surface that is inclined with respect to the horizontal is fed detached weighing products, and the load introduction direction of a weighing cell supporting the weighing chute is aligned perpendicularly to the sliding surface.

7 Claims, 1 Drawing Sheet

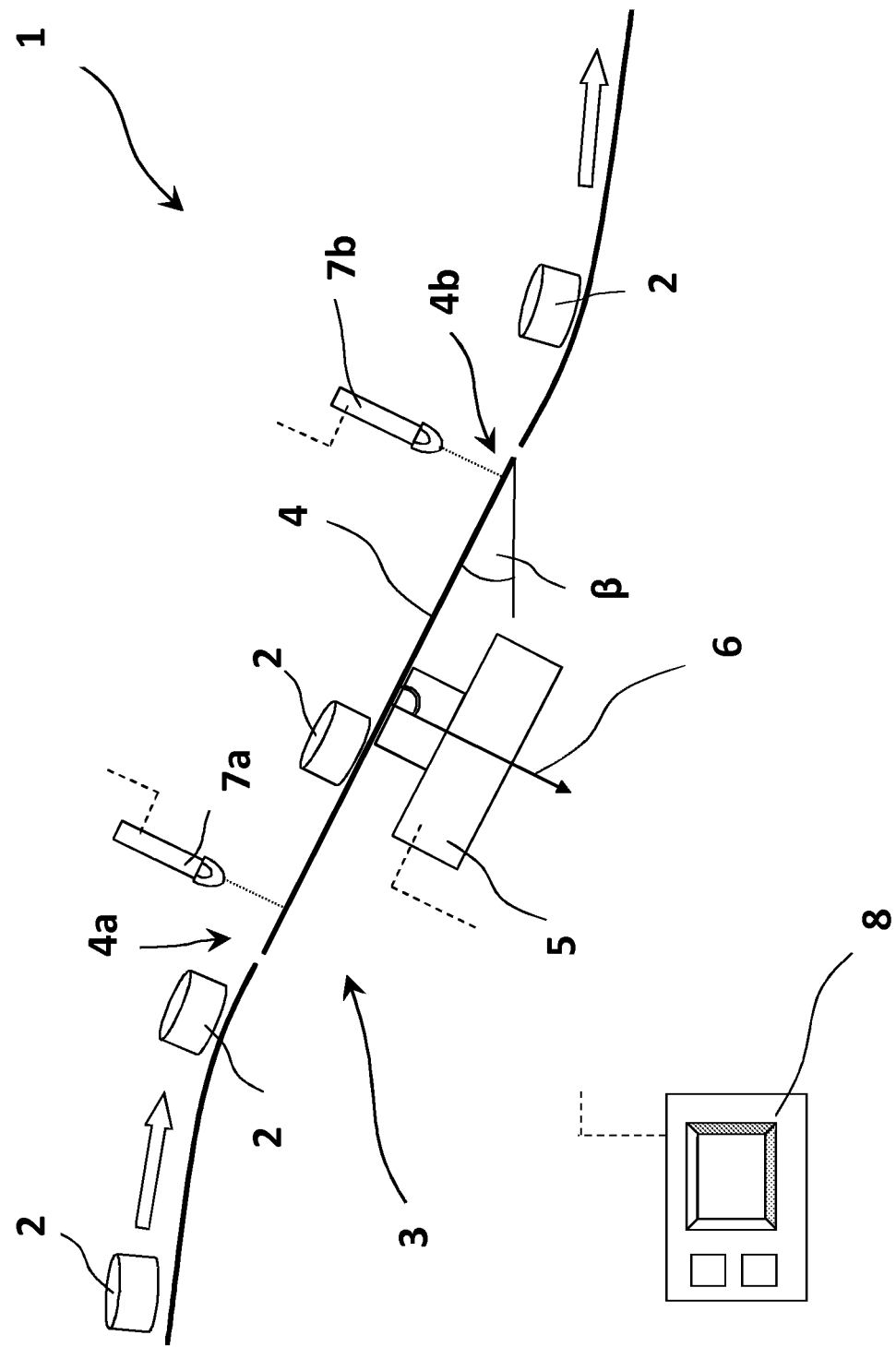

WEIGHING DEVICE FOR WEIGHING DISCRETE AND RAPIDLY MOVING OBJECTS

TECHNICAL FIELD OF THE INVENTION

The present invention pertains to a weighing device for determining the weight of discrete and rapidly moving weighing products in a speed-independent manner.

BACKGROUND OF THE INVENTION

Many industrially manufactured products are produced continuously and with high piece numbers. In the process, it is often necessary to weigh the products, for example, in order to feed a certain quantity of a product, mostly determined by the weight, to an associated packaging unit. The moving product streams here have to be weighed to avoid delays, while they are conveyed, often at high speed, through the production installations. Weighing here has a control function, as it is used in order to make it possible to check the products with regard to weight, their completeness within the packaging unit, etc.

For this purpose, scales are known that have conveyor belts that rest on a weighing cell. The conveyor belt forms a preliminary load for the weighing cell. While the product stream continues to be moved by the conveyor belt, it can be simultaneously weighed. However, the construction of such conveyor belts is expensive, it is difficult to avoid a force shunt particularly on the motor cable, and the cleaning of the components of such a conveyor belt is also expensive.

Weighing chutes are known from the prior art, wherein the product stream glides sidewise over a sliding surface that is inclined with respect to the horizontal. The chute here forms an initial load for a weighing cell for determining the weight of the product stream while it slides over the weighing chute. In order to eliminate the influence of friction effects or other dynamic forces that act along the sliding direction on the weighing chute, the weighing cell is arranged with its load introduction direction as perpendicular as possible to the sliding surface or the transport direction of the weighing chute. In this manner, the dynamic forces resulting from the movement of the product due to acceleration/deceleration always act transversely to the load introduction and therefore they have no effect on the measured result.

In comparison to driven conveyor belts, weighing chutes of simpler design can be manufactured, and they are easier to clean and nearly wear-free, whereas in the case of conveyor belts the wearing at belts and/or shafts cannot be avoided over the long term.

From DE 689 083 64 T2, such a device for weighing a continuous stream of flowing material is known. DE 199 47 394 A1 also describes a method and a device for measuring bulk product streams. However, the two methods and devices disadvantageously require the determination of the speed of the bulk product, because no absolute weight value can be formed without determining the speed. For the determination of the speed of the bulk product, various methods can therefore be considered, which are technically elaborate and associated with errors. The device is not suited for determining the weight of detached or discrete weighing products.

SUMMARY OF THE INVENTION

The invention is based on the finding that the weight of detached weighing products that are fed separately to a weighing chute is possible without the determination of the speed of said products, if the feeding of each weighing product onto the sliding surface of the weighing chute is detectable. Accordingly, it is sufficient then to trigger or carry out the weight determination by means of a weighing cell within a predetermined time interval after the detection of the fed weighing product. The speed of the weighing product is then inconsequential for the determination of the weight, as long as the residence time of the weighing product is in any case sufficient technically for determining the weight. An absolute value of the speed is, however, largely unimportant according to the invention, so that the weighing device can dispense advantageously with the means for weight determination that are known from the prior art.

The weighing device according to the invention comprises a weighing chute with a sliding surface, wherein the sliding surface is inclined with respect to the horizontal by an angle β of advantageously 25° or more. The weighing products to be weighed can be fed in detached or discrete form to the sliding surface. This means that the feeding of a weighing product onto the sliding surface can be detected individually for each weighing product.

The weighing chute with its sliding surface forms the initial load for a weighing cell, wherein the weighing cell with its load introduction device is aligned perpendicularly to the sliding surface. As a result, the dynamic effects, which act from the motion or speed of the weighing products along the sliding surface, have no effect on the load sensor of the weighing cell that is acted upon perpendicularly to said sliding surface. The weighing cell can work according to any principle known to the person skilled in the art, particularly the principle of electromagnetic force compensation.

Moreover, at least one detector is provided for the detection of a weighing product that is fed to the sliding surface. A signal of the detector can be used for triggering and/or for terminating the weighing process, wherein any sensor can be considered that is known to the person skilled in the art (ultrasound, light barrier, proximity sensor, camera, weight support, etc.).

Here, for the determination of the weight of a moving weighing product, it is sufficient to determine the force exerted by the weighing product on the sliding surface and introduced into the weighing cell, at a time that is definable (for example, via the detector), or in a time interval wherein the measured value of the weighing cell can still be adjusted by means of appropriate calibration factors. However, the determination of the speed at which the weighing product slides over the weighing chute is irrelevant for the weight determination.

The weighing device according to the invention is suitable for determining the weight of different discrete weighing products, in particular also for letters or packages. The weighing device is also particularly well-suited for discrete products that all have the same outer dimensions, such as, for example, tablets or capsules. In the case of recurring or constant dimensions of the weighing products, which are usually associated with an approximately constant weight, threshold values for triggering the weighing process can be established more easily. The weighing device according to the invention is also particularly well-suited for format-free weighing, respectively for weighing products of various formats, because special holding fixtures or matrices for the transient holding of the products can be omitted.

According to an advantageous embodiment of the invention, the at least one detector is designed particularly for determining a time window within which the weight determination can occur. For example, if a capsule to be weighed reaches, via a feed line, the upper end of the sliding surface of the weighing chute, then a detector that detects the weighing product there can transmit a signal to a higher-level control unit. For a presettable time span, which can follow immediately after the receipt of the signal of the detector, or at a presettable temporal separation therefrom, the measured value detected by the weighing cell is used for the weight determination, which can also occur in the higher-level control unit. The detector can also be formed by the weighing cell itself, by using a sudden increase or threshold value of the measured value as an indicator or trigger indicating that a weighing product has reached the sliding surface. In the same sense, the sudden decrease of the measured value can be considered an indication that the weighing product has left the sliding surface at its lower end, and thus no longer applies a load to the weighing cell. Due to the fact that the weighing products are fed to the sliding surface in a discrete or detached manner, the use of the weighing sensor as a detector is particularly appropriate, because the measured value in each case changes by a constant measured value associated with an individual weighing product, when the weighing product is fed to the sliding surface or leaves the latter at the lower end.

It is also conceivable to design the weighing device for determining the weight of several weighing products within a time window in which several weighing products are located simultaneously on the sliding surface of the weighing chute. In the case of a clever selection of the length of the sliding surface and of the feed cycle in which the weighing products are fed to the sliding surface, a step-like rise of the measured value results for each weighing product that additionally reaches the sliding surface, while the measured value decreases stepwise, when a weighing product leaves the sliding surface. If one avoids the feeding of a weighing product at the same time at which another weighing product leaves the sliding surfaces, the recorded jumps in the measured value can be assigned with precision to individual weighing products. By determining the balance of weighing products that have been fed or removed (difference process), the correct weights can be assigned in each case to the individual products, even if there are always several products on the weighing chute. From the number of weighing products present on the sliding surface, by averaging, conclusions regarding the weight of each individual weighing product can be drawn. Advantageously, the products are fed to the weighing chute in alignment with the movement path on the chute, so that jumps in the weight at the time of the impact of the products with the chute, or when they leave the latter, can be avoided.

A particularly convenient embodiment of the invention provides in each case a detector at the upper or lower end of the sliding surface, to be able to determine with greater accuracy, and independently of the value measured by a weighing cell, when the individual weighing products reach or leave the sliding surface. In this manner, the number of weighing products simultaneously present on the sliding surface can be determined accurately. In addition, the maximum length of a time window within which only one weighing product is to be fed to the sliding surface can be determined more accurately by means of these two detectors.

It is conceivable that tablets, in particular, can become statically charged as they move through a conveyor installation or a weighing chute. In order to prevent effects of this static charging on the possibly highly sensitive weighing cell beneath the weighing chute, it can be advantageous to design the weighing chute as a Faraday cage and/or to ensure a discharging of the weighing chute by means of appropriate grounding measures.

Abrasion of the weighing products that are conveyed over the weighing chute should also be prevented to the extent possible. A particularly advantageous cross-sectional shape of the weighing chute for use with tablets here is a V-shape. The two legs of the V form the sliding surfaces that are inclined to the side and connected to each other at their lower end along a preferably straight line. Tablet capsules of substantially cylindrical shape, each with semispherical abutting ends abutting on it, skid on such a V-shaped weighing chute along two parallel contact lines, as a result of which wear between the capsule and the chute is reduced to a minimum. To the extent that the two legs of the V profile are not connected to each other at the lower vertex, the gap existing in between can be used for discharging any abrasion material that nevertheless occurs, or other soiling.

Advantageously, the weighing chute according to the invention is also formed independently with respect to the action of the force of wind, in order to rule out effects originating from the weighing products themselves, such as, for example, air movements, on the weighing cell.

These and other advantages and features of the invention will be apparent from the following description of illustrative embodiments, considered along with the accompanying drawing.

BRIEF DESCRIPTION OF THE DRAWING

The FIGURE comprises a diagrammatic representation of a weighing device according to various embodiments of the present invention.

DESCRIPTION OF ILLUSTRATIVE EMBODIMENTS

The single FIGURE shows a weighing device 1 which includes a weighing chute 3 that is associated with a sliding surface 4 formed along a straight line. The sliding surface 4 is arranged so it is inclined with respect to the horizontal by an angle β. The weighing chute 3 and its associated sliding surface 4 are supported as an initial load by weighing cell 5, wherein the load introduction direction 6 of the weighing cell 5 is arranged perpendicularly to the sliding surface 4.

The sliding surface 4 is fed at its upper end 4a successively with tablets 2 that slide down, due to their own weight, along the surface of the sliding surface 4, which they leave at its lower end 4b. Two detectors 7a, 7b for the detection of individual tablets 2 are arranged at the upper and lower ends 4a, 4b of the sliding surface 4, and are connected, for the transmission of their signals, to a higher-level control unit 8. The control unit 8 also receives the measured values of the weighing cell 5, in order to be able to form a weight therefrom and output it.

The feeding of a tablet 2 at the upper end of the sliding surface 4 is detected by the detector 7a and is communicated to the control unit 8. Also a suddenly increasing or decreasing weight signal of the weighing cell can be applied as a weight trigger to the control unit for further processing, in order to trigger or terminate a measured value acquisition. Assuming that there is only one tablet 2 on the sliding surface 4, the measured value detected by the weighing cell 5 can then be used in the control unit 8 for the determination of the weight of the respective tablet 2. The measured value can be taken into consideration for a longer time period, and averaged, for example, wherein this time window then ends when the arrival of the tablet 2 at the lower end 4b of the sliding surface 4 has been detected by the detector 7b and communicated to the control unit 8.

Using the device shown, it is possible to reliably determine the weight of the tablets 2 without knowing the speed of same, wherein dynamic influences in the direction of motion remain without influence on the weight, owing to the load introduction direction that is arranged orthogonally with respect to said direction of motion. Also tablets and other weighing products conveyed at very high speed can be weighed in a simple manner with this device, wherein the throughput can be further increased by taking into consideration several tablets simultaneously on the sliding surface 4.

Upstream of the weighing device according to the invention, an appropriate feed device can be provided, in order to feed the product to be weighed to the weighing chute. Similarly, downstream of the weighing chute, a sorting device can be provided, for example, in order to be able to sort the weighed product on the basis of defined criteria.

As used herein, whether in the above description or the following claims, the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A weighing device for determining the weight of discrete and rapidly moving weighing products in a speed-independent manner, the weighing device including:

(a) a weighing chute having a sliding surface that is inclined with respect to horizontal by an angle ($\beta$) and along which the weighing products slide;

(b) a single weighing cell supporting the weighing chute so that the weighing chute forms an initial load for the weighing cell;

(c) the weighing cell having its load introduction direction aligned perpendicularly to the sliding surface; and (d) at least one detector operable to detect each respective one of the weighing products fed to the sliding surface.

2. The weighing device of claim 1 wherein the weighing products are tablets or capsules.

3. The weighing device of claim 1 or 2 wherein the at least one detector is operable for determining a time window within which the weight of a respective weighing product is to be determined.

4. The weighing device of claim 1 wherein the weighing device is designed for determining the weight of a plurality of weighing products within a time window.

5. The weighing device of claim 1 wherein a number of the weighing products that are fed to the sliding surface during a predefined time window is determined from a signal of the at least one detector.

6. The weighing device of claim 1 wherein the sliding surface is provided at an inlet area with a first detector and is provided at an outlet area with a second detector, the first detector and second detector being operable to detect a throughput of a respective weighing product so as to facilitate a determination of a start and an end of a time window for determining the weight of that respective weighing product.

7. The weighing device of claim 1 wherein the at least one detector includes an upper detector located at an upper end of the sliding surface in position to detect a respective weighing product entering the weighing chute at the upper end of the sliding surface.

* * * * *